United States Patent [19]

Gamble et al.

[11] 3,786,272
[45] Jan. 15, 1974

[54] HALL EFFECT ROTARY PULSE GENERATOR

[75] Inventors: John G. Gamble, Simsbury; Richard J. Flis, Plantsville, both of Conn.

[73] Assignee: Veeder Industries, Inc., Hartford, Conn.

[22] Filed: Nov. 3, 1972

[21] Appl. No.: 303,355

[52] U.S. Cl............... 307/106, 73/DIG. 3, 73/519, 310/DIG. 3
[51] Int. Cl. ............................................. G01p 3/48
[58] Field of Search.............. 307/106; 73/DIG. 3, 73/518, 519; 324/168, 171, 174; 310/168, 310/169, 170, DIG. 3; 318/138; 317/5, 6

[56] References Cited
UNITED STATES PATENTS 3,742,267  6/1973  Papst et al. .................... 310/168
2,798,976  7/1957  Eckel et al. ..................... 310/170 X
2,651,734  9/1953  Field ............................... 310/169

FOREIGN PATENTS OR APPLICATIONS 893,986  4/1962  Great Britain ..................... 324/174

Primary Examiner—David Smith, Jr.
Assistant Examiner—William J. Smith
Attorney—John M. Prutzman et al.

[57] ABSTRACT

A rotary electrical pulse generator having a support block, a pair of Hall probes adjustably mounted in diametrically opposed support recesses in the block, a rotor mounted on the block having a pair of axially spaced coaxial magnet rings providing an axial gap receiving the Hall probes to generate electrical signals as the rotor rotates, and a one-way brake mechanism selectively installable for use in preventing rotation of the rotor in a selected direction.

6 Claims, 4 Drawing Figures

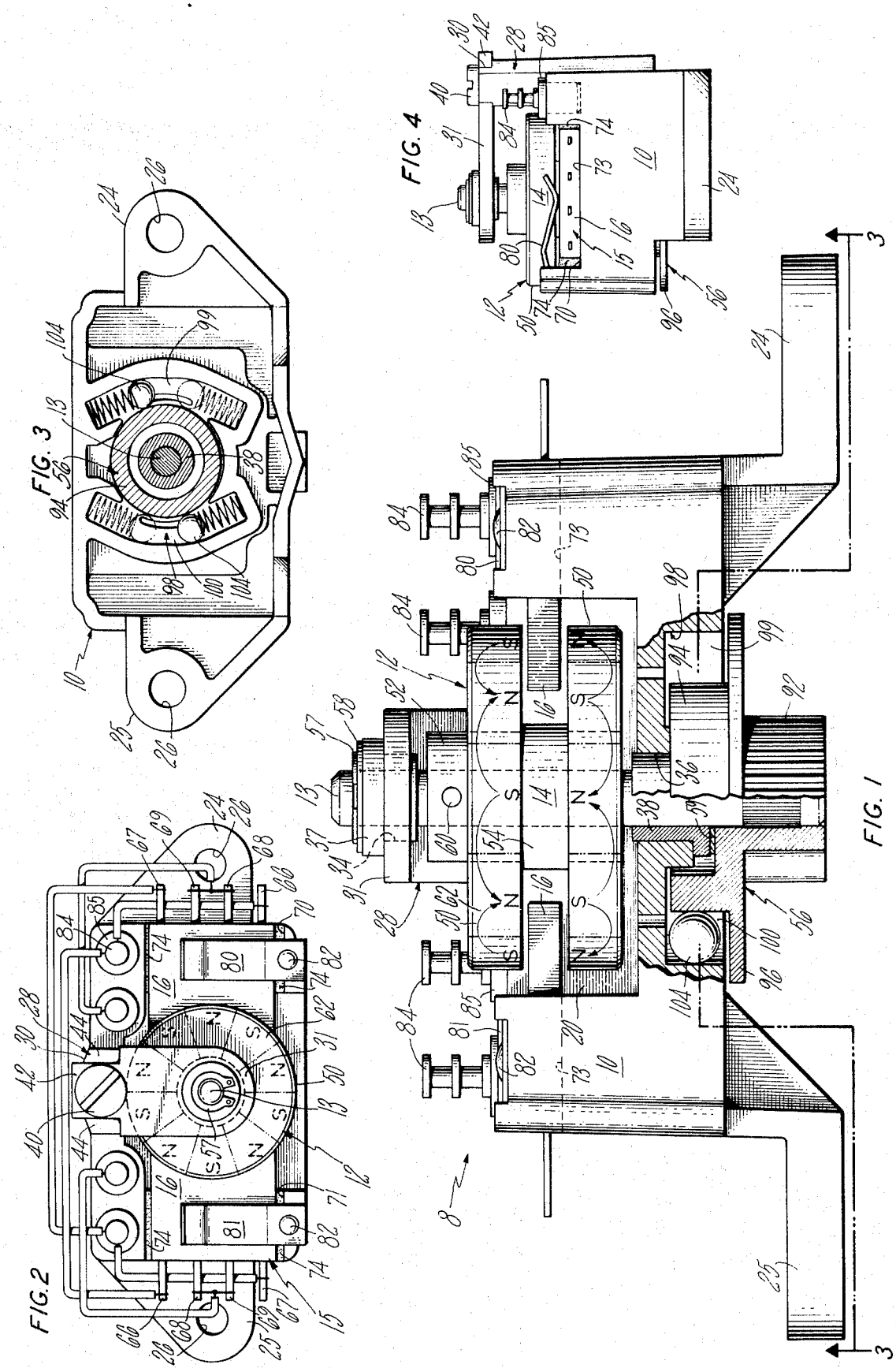

HALL EFFECT ROTARY PULSE GENERATOR

BRIEF SUMMARY OF THE INVENTION

The present invention generally relates to Hall effect rotary pulse generators having a magnetic rotor operable for generating an electrical pulse or signal for each predetermined angular increment of rotation of the rotor.

It is principal aim of the present invention to provide a new and improved Hall effect rotary pulse generator having a compact and economical design providing an extremely long service free operational life.

It is another aim of the present invention to provide a new and improved Hall effect rotary pulse generator having a magnetic rotor for producing an electrical pulse or signal for each predetermind fixed angular increment of rotation irrespective of its rate of rotation and without production of spurious pulses.

It is another aim of the present invention to provide a new and improved Hall effect rotary pulse generator useful in determining the relative position of relatively movable parts.

It is a further aim of the present invention to provide a new and improved Hall effect rotary pulse generator useful in fluid dispensing apparatus in combination with a fluid meter for generating a pulse train with a pulse for each predetermined fixed increment of fluid dispensed.

It is another aim of the present invention to provide a new and improved Hall effect rotary pulse generator of the type shown and described in U.S. Pat. No. 3,742,243, June 26, 1973 and entitled Pulse Generator.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 1 is a front elevation view, partly broken away and partly in section, of a Hall effect rotary pulse generator incorporating an embodiment of the present invention;

FIG. 2 is a reduced top plan view of the pulse generator;

FIG. 3 is a reduced bottom section view, partly broken away and partly in section, of the rotary pulse generator showing a one-way brake mechanism thereof in full lines in one operative position and in broken lines in another operative position; and FIG. 4 is a reduced side elevation view of the rotary pulse generator.

DESCRIPTION OF PREFERRED EMBODIMENT

Referring now to the drawings in detail wherein like numerals represent like parts throughout the several figures, a Hall effect rotary pulse generator 8 incorporating an embodiment of the present invention comprises a non-magnetic metal one-piece support block 10, a rotor 12 with a rotor shaft 13 and a spool magnet subassembly 14 mounted on the shaft 13, and a pick-up or readout assembly 15 with a pair of diametrically opposed Hall probes or pickups 16.

The one-piece support block 10 has a central pocket 20 for receiving the spool magnet subassembly 14, a pair of diametrically opposed depending L-shaped legs 24, 25 with diametrically opposed apertures 26 for receiving suitable fasteners, not shown, for mounting the pulse generator to associated apparatus, and a rear upstanding central post 28 having a bifurcated upper end 30 for mounting an upper cantilever arm support 31 for the rotor 12. The cantilever arm support 31 has an aperture 34 above the central pocket 20 and the block 10 has a second coaxial aperture 36 below the pocket 20 for receiving bushings 37, 38 for rotatably supporting the rotor 21 upright on the block. The upper arm support 31 is secured to the post 28 by a screw fastener 40 to overly the pocket 20 and the support 31 has a reduced rear end portion 42 received between the ends 44 of the bifurcated end 30 of the post 28 to locate and retain the arm support 31 in the proper position.

The spool magnet subassembly 14 comprises a non-magnetic hub 52 with an enlarged central annular spacer flange 54 and a pair of substantially identical coaxial permanent magnet rings 50 fixed onto the reduced outer ends of the hub 52 in engagement with the spacer flange 54 which thereby provides for maintaining the magnet rings 50 in a predetermined axially spaced relationship with a relatively small axial air gap (e.g., 0.090 in.) therebetween. A combination spur gear and brake drum member 56 is press fit on the lower knurled end of the rotor shaft 13, with the lower end face of the combination member 56 substantially flush with the lower end face of the shaft 13, and a conventional C-shaped locking ring 57 is mounted within an annulus in the upper end of the shaft 13. Spacer washers or shims 58, 59 are mounted on the shaft 13 for properly axially locating the rotor on the block 10 and to limit end play. One end of the hub 52 is pinned to the shaft 13 by pin 60 to secure the rotor parts together.

Each of the permanent magnet rings 50 is formed by a single piece of ceramic or other suitable permanent magnet material preferably having a high coercive force and is premagnetized to form a plurality of substantially equiangularly spaced contiguous U-shaped permanent magnets 62 having axially inwardly facing poles of alternating polarity.

As described in the aforementioned U.S. Pat. No. 3,742,243 and as shown in FIGS. 1 and 2, the two coaxial magnet rings 50 are angularly related with their opposed individual magnets 62 in axial alignment and in magnetic attraction and such that an annular magnetic field of angularly alternating relatively high intensity flux field columns are produced in the air gap between the magnet rings 50. Accordingly, the magnet rings 50 provide a plurality of generally oval or racetrack shaped highly efficient magnetic circuits which are contiguous to each other and which are individually composed of two opposed U-shaped permanent magnets 62 and a minimum air gap resulting from the ring magnet spacing. The stray or flux leakage paths from the magnetic circuits are minimal and discrete and dense flux columns are provided across the air gap between the magnet rings 50.

Each Hall probe 16 employs a suitable Hall sensor which, for example, forms a part of a solid state chip providing a magnetically operated solid state switch or digital threshold device (to which D.C. power is supplied via connector lead 66, 67) that is operable to generate an electrical pulse or signal (which is received via connector leads 68, 69) upon the application of an appropriate flux field (having an intensity, determined by the solid state switch) to the Hall sensor. For example, the ISSI solid state probe made by Micro Switch Corporation and comprising a Hall sensor, a threshold trigger, and an amplifier and formed by a single silicon integrated circuit may be used for this purpose. More particularly, the ISSI solid state probe, being unidirectional, requires that the magnetic field be in an appropriate direction to generate a pulse and "closes" to initiate a pulse or signal when the flux density applied to its Hall sensor reaches a first relatively high intensity threshold field and "opens" to terminate the pulse or signal when the flux density falls to a second relatively low intensity threshold field.

The block 10 has a pair of diametrically spaced enlarged recesses or slots 70, 71 and the generally flat box-like Hall probes 16 are mounted in the pockets 70, 71 on coplanar support faces 73 thereof to extend into the air gap between the magnet rings 50. The coplanar support faces 73 lie on a plane extending perpendicular to the axis of the rotor and intersecting the axial air gap between the magnet rings 50 so that both Hall probes 16 may be readily accurately portioned in the small air gap between the magnet rings 50 without contacting the rings 50. The slots 70, 71 are wider than the probes 16 to permit circumferential adjustment of the probes to provide for accurately adjusting the pulse spacing produced by the pair of probes 16. The probes 16 may also be radially adjusted to center the Hall sensor in the magnetic field produced between the magnet rings 50.

Leaf spring clips 80, 81 are secured within slots in the block 10 by pins 82 to extend over the pockets 70, 71 and to provide for holding the probes 16 in the pockets while permitting adjustment of the probes 16 to the proper position. After adjustment the Hall probes 16 are rigidly secured within the pockets 70, 71 by applying strips 74 of a suitable epoxy adhesive along the edges of the probes 16.

Four electrical posts 84 having insulators 85 are press fit in line into suitable bores along the upper rear edge of the block 10 and the four Hall probe connectors 66–69 are electrically connected to the posts 84 by suitable electrical leads and the posts 84 thereby provide electrical terminals for supplying D.C. power to both Hall probes 16 and for receiving the train of pulses generated by the Hall probes 16.

The magnet rings 50 may have an odd number of U-shaped permanent magnets 62 as shown in FIG. 2 and the Hall probes 16 may be mounted on the support block 10 to generate a signal in response to the same field direction whereby the signals produced by the two diametrically opposed probes 16 are substantially equally spaced.

Also by mounting the probes 16 to be responsive to fields of opposite directions, the probes would generate substantially equally spaced signals when the ring magnets 50 had an even number of U-shaped magnets 62. Likewise the probes 16 could be used to generate generally simultaneous signals by mounting the probes to be responsive to the same field direction when the magnet rings 50 have an even number of U-shaped magnets 62 or by mounting the probes to be responsive to opposite field directions when the magnet rings 50 have an odd number of U-shaped magnets 62. Also, when the probes provide for generating generally simultaneous signals, the probes 16 can be circumferentially adjusted in their support slots to provide for slightly spaced either overlapping or non-overlapping signals which may then be separately fed into an appropriate circuit for determining the direction of rotation of the rotor.

The combination gear and brake drum member 56 comprises a lower spur gear 92 positioned between the depending support legs 24, 25, an upper annular brake drum 94 having an outer brake drum surface, and a radial flange 96 intermediate the spur gear 92 and brake drum 94. The annular brake drum 94 is received within a lower downwardly opening pocket 98 formed in the block 10 (which is preferably die cast to accurately form the pocket 98 and the other parts of the block) and the radial flange 96 provides a cover for the pocket 98. The pocket 98 is contoured to have two diametrically opposed generally U-shaped pocket portions 99, 100 each having a pair of leg pockets extending generally tangentially from the outer surface of the annular brake drum 94. Suitable locking balls 104 (or alternatively suitable cylindrical locking elements) are mounted in two of the diametrically opposed leg pockets for engagement with the outer pocket sidewall and the outer brake drum surface. Suitable compression retainer springs are mounted within the leg pockets for biasing the balls into such engagement and the outer pocket sidewalls are contoured to wedge the balls against the outer brake drum surface so that the pair of diametrically opposed balls are effective to prevent rotation of the rotor in one angular direction (in the clockwise direction as seen in FIG. 3) without creating any substantial resistance against rotation in the opposite angular direction. The balls and springs can be readily installed into a selected pair of the diametrically opposed leg pockets for preventing rotation in the desired direction. Also, of course, the balls and ball retainer and springs could be left out of the assembly to permit the rotor to be rotated in both angular directions.

As will be apparent to persons skilled in the art, various modifications, adaptations and variations of the foregoing specific disclosure can be made without departing from the teachings of the present invention.

We claim:

1. A rotary electrical pulse generator comprising a rotor with a rotor shaft and a spool magnet subassembly with a non-magnetic hub fixed onto the rotor shaft intermediate the ends thereof having reduced end portions and an intermediate annular flange portion and a pair of substantially identical magnet rings fixed coaxially onto the reduced end portions of the hub in engagement with the annular flange portion which thereby establishes a fixed axial air gap between the magnet rings, each magnet ring being axially magnetized to have an even plurality of equiangularly spaced inner permanent magnet poles of alternating magnetic polarity, the pair of magnet rings being mounted on the hub with their respective permanent magnet poles in substantially axially aligned magnetic attraction whereby an annular alternating magnetic field is produced in the air gap between the magnetic rings; a support block having a first upright mounting aperture, a first upwardly opening pocket at the upper end of said first mounting aperture for receiving the spool magnet subassembly and a second downwardly opening pocket at the lower end of the first mounting aperture, an upper cantilever arm mounted on the support block to extend over the first pocket, the cantilever arm having a second mounting aperture in axially spaced alignment with the first mounting aperture, rotor support bushings mounted within the aligned apertures receiving the rotor shaft for rotatably supporting the rotor upright on the support block, an upper retaining ring mounted on the upper end of the rotor shaft above the cantilever arm for retaining the rotor against downward axial movement on the block, a combination gear and brake drum member fixed onto the lower end of the rotor shaft below the first aperture having a lower spur gear portion and an upper brake drum portion with an outer brake drum surface received in the second pocket, the second pocket having a pair of diametrically opposed generally V-shaped pocket portions each having a pair of angularly related leg pockets extending generally tangentially from the outer brake drum surface to form two pairs of diametrically opposed leg pockets, a pair of locking elements in the leg pockets of one of said pairs of diametrically opposed leg pockets in engagement with the brake drum surface, each pair of diametrically opposed leg pockets having outer sidewalls for wedging the locking elements against the brake drum surface for preventing rotation of the rotor in one angular direction, and compression springs in said one pair of leg pockets biasing the locking elements into engagement with the brake drum surface and the respective outer sidewalls, the combination gear and brake drum member retaining the rotor against upward axial movement on the block and having an annular flange for retaining the locking elements and compression springs within the leg pockets, the block having a pair of diametrically opposed slots extending radially outwardly from the first pocket, a pair of Hall probes mounted in the slots to extend within the air gap to be acted upon by the alternating magnetic field to generate substantially equally spaced pulses as the rotor rotates, and a plurality of electrical terminal posts mounted on the block and connected to the Hall probes to provide for electrical connection to the rotary pulse generator.

2. A rotary electrical pulse generator comprising a rotor with a rotor shaft and a spool magnet subassembly with a non-magnetic hub fixed onto the rotor shaft intermediate the ends thereof having reduced end portions and an intermediate annular flange portion and a pair of substantially identical magnet rings fixed coaxially onto the reduced end portions of the hub in engagement with the annular flange portion which thereby establishes a fixed axial air gap between the magnet rings, each magnet ring being axially magnetized to have an even plurality of equiangularly spaced inner permanent magnet poles of alternating magnetic polarity, the pair of magnet rings being mounted on the hub with their respective permanent magnet poles in substantially axially aligned magnetic attraction whereby an annular alternating magnetic field is produced in the air gap between the magnet rings; a support frame having upper and lower coaxial mounting apertures receiving the rotor shaft for rotatably supporting the rotor upright on the frame and a plurality of depending support legs angularly spaced about the rotor shaft, a gear member fixed onto the lower end of the rotor shaft between the support legs, and at least one Hall probe mounted on the frame to extend within the air gap to be acted upon by the alternating magnetic field to generate a pulse for each fixed angle of rotation of the rotor.

3. A rotary electrical pulse generator comprising a rotor with a rotor shaft and a spool magnet subassembly with a non-magnetic hub fixed onto the rotor shaft intermediate the ends thereof and a pair of substantially identical magnet rings fixed coaxially onto the hub and with an axial air gap between the magnet rings, each magnet ring being axially magnetized to have an even plurality of equiangularly spaced inner permanent magnet poles of alternating magnetic polarity, the pair of magnet rings being mounted on the hub with their respective permanent magnet poles in substantially axially aligned magnetic attraction whereby an annular alternating magnetic field is produced in the air gap between the magnet rings; a support frame having a first upright bore receiving the rotor shaft, a pocket at the upper end of the first bore for receiving the spool magnet subassembly, a plurality of angularly spaced depending support legs below the first bore, and an upper cantilever arm extending over the pocket, the cantilever arm being a second bore in axially spaced alignment with the first bore receiving the rotor shaft, a drive gear fixed onto the lower end of the rotor shaft between the depending support legs, at least one Hall probe mounted on the support block to extend within the air gap to be acted upon by the alternating magnetic field to generate substantially equally spaced pulses as the rotor rotates.

4. A rotary electrical pulse generator comprising a rotor with a pair of coaxial substantially identical magnet rings with an axial air gap therebetween, each magnet ring being axially magnetized to have an even plurality of equiangularly spaced axially inwardly facing permanent magnet poles of alternating magnetic polarity, the pair of magnet rings being mounted on the hub with their respective permanent magnet poles in substantially axially aligned magnetic attraction whereby an annular alternating magnetic field is produced in the air gap between the magnet rings; a rotor support block rotatably supporting the rotor and having a pocket for receiving the pair of coaxial magnet rings and a pair of angularly spaced slots with coplanar support faces lying in a plane extending perpendicular to the axis of the rotor and intersecting the air gap between the magnet rings, and a pair of magnetic field responsive pickups mounted on the coplanar support faces of the angularly spaced slots to extend into the air gap and adapted to be acted upon by the annular alternating magnetic field such that each pick generates substantially equally spaced pulses as the rotor rotates.

5. A rotary electrical pulse generator according to claim 4 wherein the angularly spaced slots have a circumferential width greater than the width of the pickups such that the pickups may be angularly adjusted about the axis of the rotor on the coplanar support faces to adjust the spacing between the pulses generated by the pair of pickups.

6. A rotary electrical pulse generator according to claim 5 further comprising resilient means mounted on the rotor support block for engagement with the pickups for biasing the pickups against the coplanar support faces while permitting angular adjustment of the pickups.

* * * * *